United States Patent
Kim

[19]

[11] Patent Number: 6,119,177
[45] Date of Patent: Sep. 12, 2000

[54] DIGITAL VIDEO DISK ROM INTERFACING APPARATUS AND METHOD THEREOF

[75] Inventor: Jeh-won Kim, Goyang, Rep. of Korea

[73] Assignee: Samsung Electronics, Co., Ltd., Suwon, Rep. of Korea

[21] Appl. No.: 09/000,983

[22] Filed: Dec. 30, 1997

[30] Foreign Application Priority Data

Dec. 30, 1996 [KR] Rep. of Korea ............... 96-76994

[51] Int. Cl.[7] .............................................. G06F 13/00
[52] U.S. Cl. ................................ 710/34; 710/29
[58] Field of Search .......................... 710/29, 33–35, 710/52, 53, 57

[56] References Cited

U.S. PATENT DOCUMENTS

| | | | |
|---|---|---|---|
| 4,831,523 | 5/1989 | Lewis et al. | 364/200 |
| 4,837,563 | 6/1989 | Mansfield et al. | 340/732 |
| 5,261,072 | 11/1993 | Siegel | 395/425 |
| 5,450,546 | 9/1995 | Krakirian | 395/250 |
| 5,452,432 | 9/1995 | Macachor | 395/425 |
| 5,469,548 | 11/1995 | Callison et al. | 395/441 |
| 5,640,602 | 6/1997 | Takase | 395/855 |
| 5,647,057 | 7/1997 | Roden et al. | 395/275 |

*Primary Examiner*—Ayaz R. Sheikh
*Assistant Examiner*—Jigar Pancholi
*Attorney, Agent, or Firm*—Marger Johnson & McCollom, P.C.

[57] ABSTRACT

In an ATAPI device and method for interfacing a digital video disk signal processor with a data processor, a digital video disk ROM interfacing apparatus controls data transmission from the digital video disk signal processor to the ATAPI interfacing apparatus such that a plurality of bytes of data are transmitted for each data transmission request. In the digital video disk ROM interfacing apparatus, a byte designator stores a number of designated units which is the number of data units which are to be transmitted once. A counter up-counts when a data unit is transmitted and outputs a number of transmitted units. A comparator compares the number of designated units output by the byte designation means with the number of transmission units output by the counter. A data request signal generator requests data transmission to the digital video disk signal processor according to a comparison result from the comparator.

17 Claims, 7 Drawing Sheets

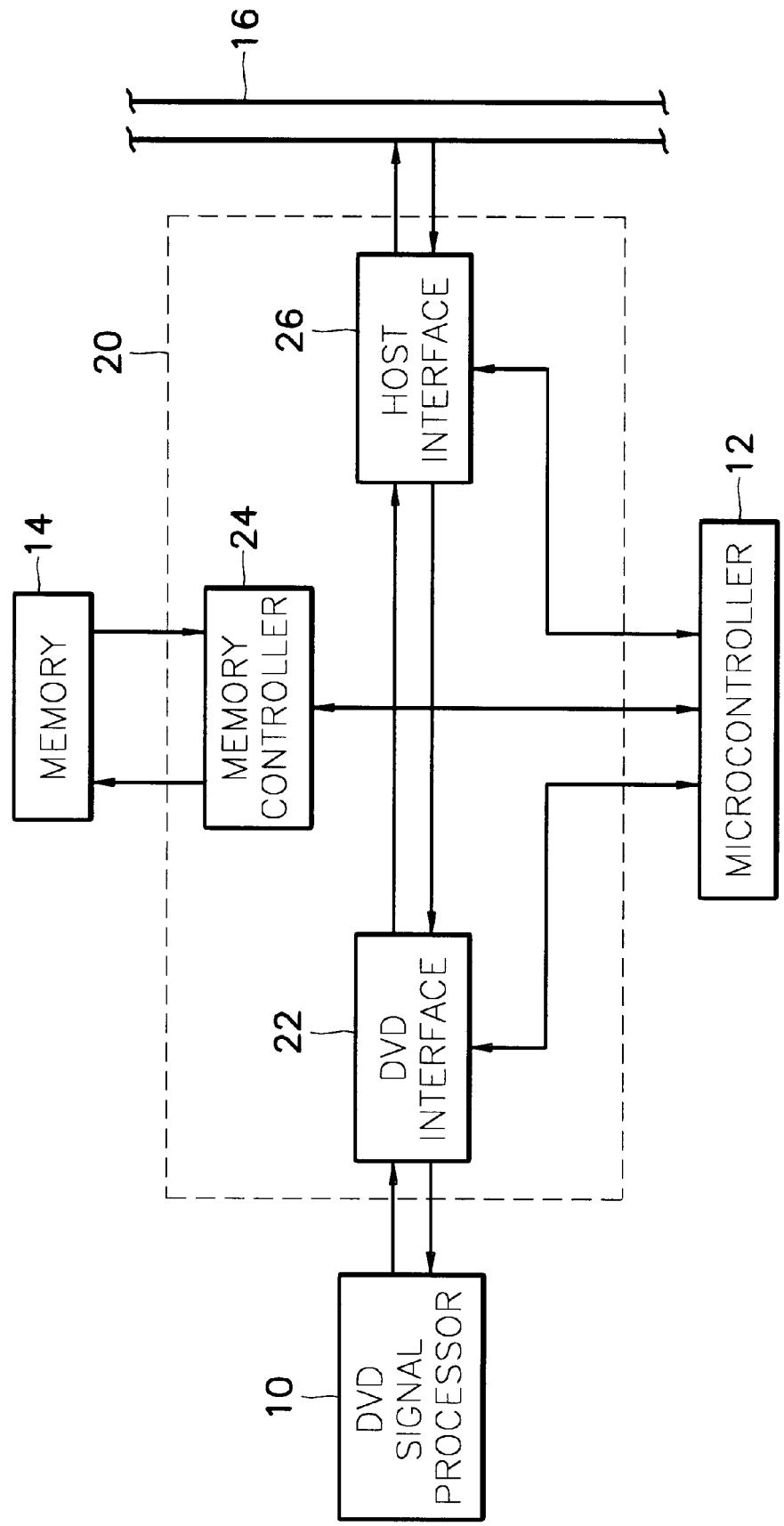

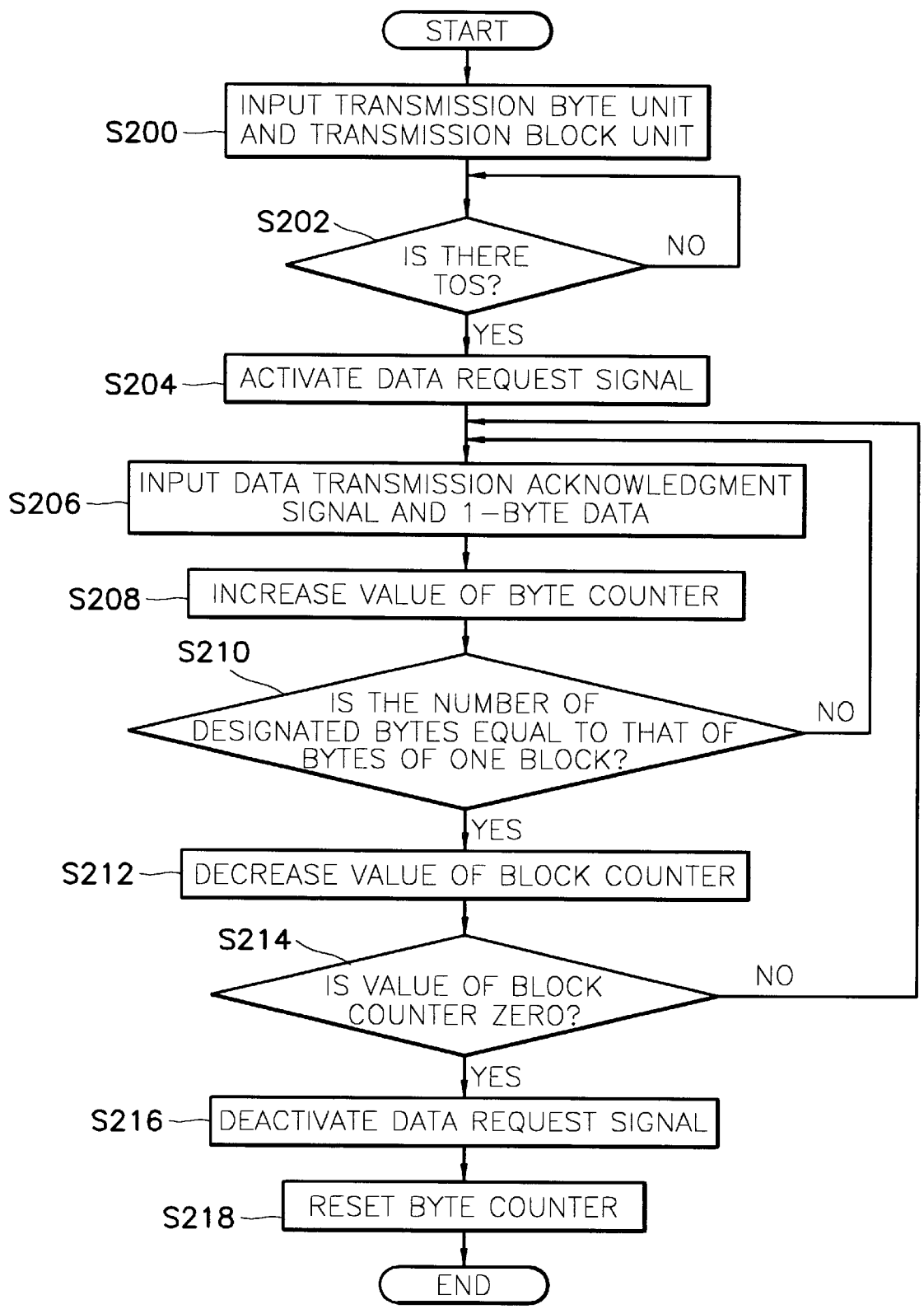

DIGITAL VIDEO DISK ROM INTERFACING APPARATUS AND METHOD THEREOF

BACKGROUND OF THE INVENTION

1. Field of the Invention

The present invention relates to a digital video disk ROM interface. More particularly, the present invention relates to a digital video disk ROM (DVD-ROM) interfacing apparatus for controlling data transmission from a digital video disk (DVD) signal processor to an ATAPI interface device, and a method thereof.

2. Description of the Related Arts

A digital video disk (DVD), which is a medium for storing moving images and sound signals at high density, has a storage capacity of several times as large as that of a conventional compact disk (CD). The above DVD having a large storage capacity can also be used as an auxiliary memory device of a computer.

The DVD-ROM system includes servo mechanisms (automatic devices that use feedback to govern the physical position of a mechanical element such as a read/write head) for reading a signal recorded on a disk by controlling the rotation of a spindle motor, the tracking of a pickup on the disk, the laser output and the focusing of the laser beam output from the pickup; a DVD signal processor for demodulating and decoding the read signal to recover an original data; and an advanced technology attachment packet interface (ATAPI) device for interfacing the DVD signal processor with a data processor such as a personal computer.

FIG. 1 is a block diagram of a typical ATAPI device. An ATAPI device 20 includes a DVD interface 22 for inputting reproduced data from a DVD signal processor 10 under the control of a microcontroller 12, a memory controller 24 for controlling a memory 14 to store or read the data input from the DVD interface 22 in or from the memory 14, and a host interface 26 for receiving an operation commands and other control signals from a host computer through an ATAPI bus 16 and transmitting the received commands and control signals to the microcontroller 12 and the DVD interface 22 and the reproduced data to the host computer 18 through the ATAPI bus 16.

Now referring to FIG. 1A, the elements shown below in FIG. 3 are part of a system to deliver video/audio data to a user. The DVD-ROM system 30 processes data stored on a DVD and transmits the processed data to the host computer 18. The DVD-ROM system 30 may be remotely located from the host computer 18 in the manner that a server is remotely located from a client computer. One or more computer outputs the processed data in the form of video and/or audio signals which may be viewed/listened to by a user on one or more video output 33 and one or more audio outputs 31, 35. Input and output devices associated with the DVD-ROM system, computer and display output devices are suitably interfaced with the interconnections made and required for operation.

Meanwhile, according to an interface between a CD signal processor and the a CD-ROM decoder of a conventional CD-ROM system, data is transmitted unilaterally from the CD signal processor to the CD-ROM decoder. However, under such an interfacing scheme, the CD-ROM decoder receives data regardless of the state of its buffer memory, which causes difficulties in effective control of the buffer memory of the system. To make matters worse, the unilateral interfacing scheme may cause a malfunction of the system, especially in a system operating at high speed.

Accordingly, the DVD-ROM system employs a handshaking scheme so that the DVD signal processor 10 transmits data only when there is a request from the ATAPI interface device 20. Here, only one byte of data for one data request signal is transmitted.

Referring to FIG. 2, when one block of data is to be transmitted from the DVD signal processor 10 to the ATAPI interface device 20, a top of signal (TOS) is input from the DVD signal processor 10 to a DVD interface 22 of the ATAPI device 20 as a block start signal.

Subsequently, the microcontroller 12 checks the state of an external memory 14 which functions as a buffer. When the memory 14 has enough space to store data, the DVD interface 22 transmits a data requesting signal data_req to the DVD signal processor 10. When the DVD signal processor 10 detects a falling edge of the data requesting signal, the DVD signal processor 10 outputs one byte of data together with a data transmission acknowledgment signal data_ack to the ATAPI device 20. Upon receiving the rising edge of the data transmission acknowledgment signal data_ack, the ATAPI device 20 deactivates the data request signal data_req. Then, the ATAPI device 20 receives the transmitted data DATA0 in synchronicity with the falling edge of the data transmission acknowledgment signal data_ack Afterwards, a second data is input by transmitting the data request signal data_req to the DVD signal processor 10, and such steps are repeatedly carried out to receive a plurality of data.

According to the above DVD interface of the conventional ATAPI device, the transmission efficiency is low and the burden of the microcontroller is excessively heavy since one data request signal data_req is transmitted for one byte of data.

SUMMARY OF THE INVENTION

One object of the present invention is to provide a digital video disk ROM (DVD-ROM) interfacing apparatus for which a plurality of bytes of data are transmitted from a digital video disk (DVD) signal processor to an ATAPI device in response to a transmission request signal.

Another object of the present invention is to provide a digital video disk ROM (DVD-ROM) interfacing method in which a plurality of bytes of data are transmitted from a digital video disk (DVD) signal processor to an ATAPI device in response to a transmission request signal.

Yet another object of the present invention is to provide a digital video disk ROM (DVD-ROM) interfacing apparatus by which a plurality of blocks of data are sequentially transmitted from a digital video disk (DVD) signal processor to an ATAPI device in response to a transmission request signal.

Still yet another object of the present invention is to provide a digital video disk ROM (DVD-ROM) interfacing method in which a plurality of blocks of data are sequentially transmitted from a digital video disk (DVD) signal processor to an ATAPI device in response to a transmission request signal.

In order to achieve one of the objects above, there is provided a digital video disk ROM interfacing apparatus for controlling data transmission from a digital video disk signal processor to a ATAPI interfacing apparatus in an ATAPI device for interfacing the digital video disk signal processor with a data processor. The apparatus includes byte designation means for storing a number of designated units which is equivalent to the number of data units which are to be transmitted together; a counter for up-counting whenever one data unit is transmitted to output a number of transmitted units; a comparator for comparing the number of designated units output by the byte designation means with the number of transmission units output by the counter; and a data request signal generator for requesting data transmission to the digital video disk signal processor according to a comparison result of the comparator.

In order to achieve another one of the objects described above, there is provided a digital video disk ROM interfacing method for controlling data transmission from a digital video disk signal processor to an ATAPI interfacing apparatus in an ATAPI device for interfacing the digital video disk signal processor with a data processor. The method includes the steps of storing a number of designated units which is equivalent to the number of data units which are to be transmitted together; activating a data request signal; receiving a data transmission acknowledgment signal and one unit of data from the digital video disk signal processor; up-counting whenever one unit of data is transmitted to count the number of transmission units; comparing the number of the designated units with the number of transmission units; and inactivating a data request signal according to the comparison result.

In order to achieve yet another one of the objects above, there is provided a digital video disk ROM interfacing apparatus for controlling data transmission from a digital video disk signal processor to a ATAPI interfacing apparatus in an ATAPI device for interfacing the digital video disk signal processor with a data processor. The apparatus includes byte designation means for storing a number of designated units which is the number of data units which are to be transmitted together; a first counter for up-counting whenever one data unit is transmitted and to output a number of transmitted units; a first comparator for comparing the number of designated units output by the byte designation means and the number of transmission units output by the first counter; a block counter for storing the number of data blocks to be transmitted and decrementing the stored value by one whenever one block is transmitted; and a data request signal generator for requesting data transmission to the digital video disk signal processor according to a comparison result of the comparing means and an counted value of the block counter.

In order to achieve still yet another one of the objects above, there is provided a digital video disk ROM interfacing method for controlling data transmission from a digital video disk signal processor to an ATAPI interfacing apparatus in an ATAPI device for interfacing the digital video disk signal processor with a data processor. The method includes the steps of storing a number of designated units which is the number of data units which are to be transmitted once and a number of data blocks which are to be transmitted; activating a data request signal; receiving a data transmission acknowledgment signal and one unit of data from the digital video disk signal processor; up-counting whenever one unit of data is transmitted to count the number of transmission units; comparing the number of the designated units with the number of the transmission units; comparing a number of transmitted blocks with the number of data blocks to be transmitted; and inactivating the data request signal according to a comparison result of the number of the designated units with the number of the transmitted data units and a comparison result of the number of blocks to be transmitted with the number of transmitted data blocks.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

To increase the data transmission capability of an ATAPI device by providing transmission of more than one byte of data per data request signal, this invention provides an apparatus and method for bundling a number of data units for transmission together in response to data request signa.

Figure 1A:
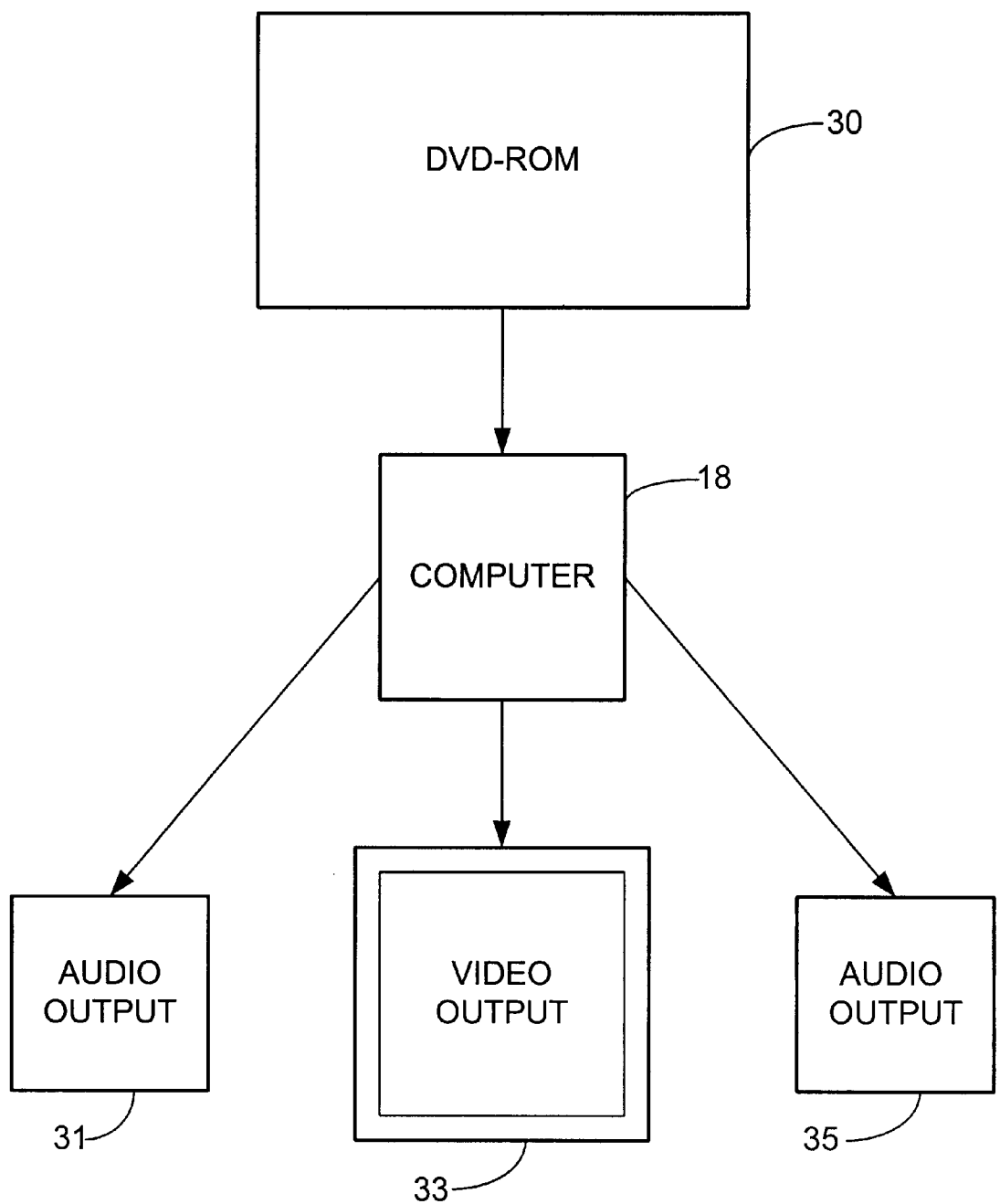
FIG. 1A shows the interfacing apparatus as part of a system to deliver audio/video data to a user.
Figure 2:
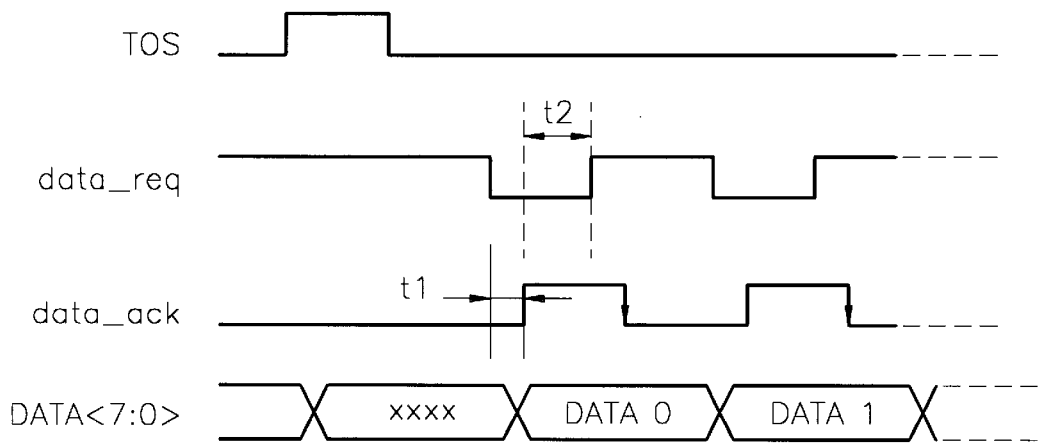
FIG. 2 is a timing diagram of signals received and transmitted by a conventional digital video disk ROM (DVD-ROM) interfacing apparatus.
Figure 3:
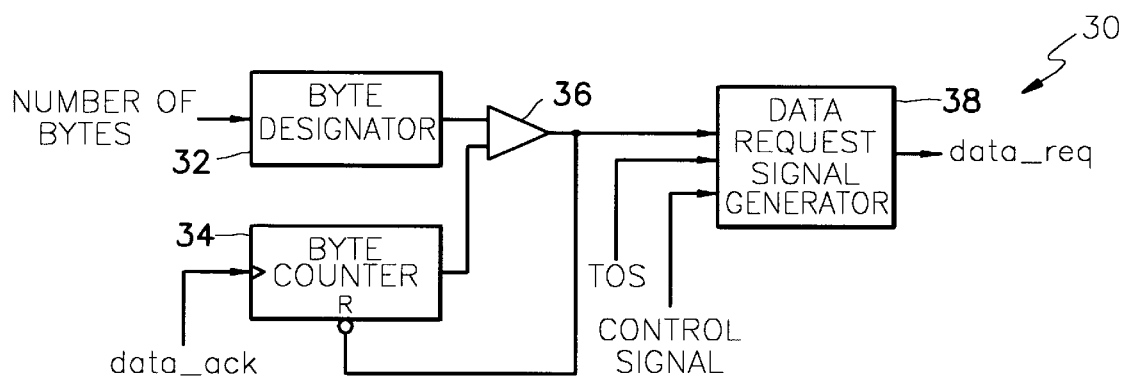
FIG. 3 is a block diagram of an embodiment of a DVD-ROM interfacing apparatus according to the present invention.

Now, referring to FIG. 3, a DVD-ROM interfacing apparatus 30 includes a byte designator 32, a byte counter 34, a comparator 36 and a data request signal generator 38.

The byte designator 32 receives a unit of data transmission, i.e., the number of bytes, N, designated by the microcontroller 12, and stores a value N−1.

The byte counter 34 receives a data transmission acknowledgment signal data_ack from the DVD signal processor 10 via its clock input port to count from 0 to N−1.

The comparator 36 compares the counted value from the byte counter 34 with the number stored in the byte designator 32. When the counted value is equal to the number N−1, the comparator 36 outputs a low level signal. At this time, the output of the comparator 36 resets the byte counter 34 to zero.

The data request signal generator 38 generates a data request signal data_req according to the comparison result and outputs the data request signal data req to the DVD signal processor 10. Thus, the amount of data transmitted in response is greater than one byte of data because the comparison result will be typically greater than one. Without this invention, there would be no way for the data request signal generator to know how much data is actually available for transmission.

Figure 4:
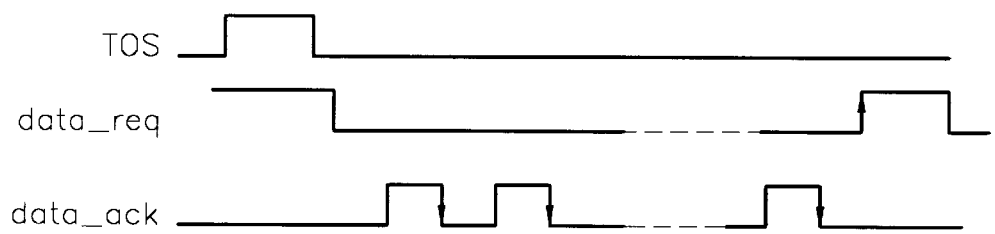
FIG. 4 is a timing diagram of signals received and transmitted by a DVD-ROM interfacing apparatus of FIG. 3.
Figure 5:
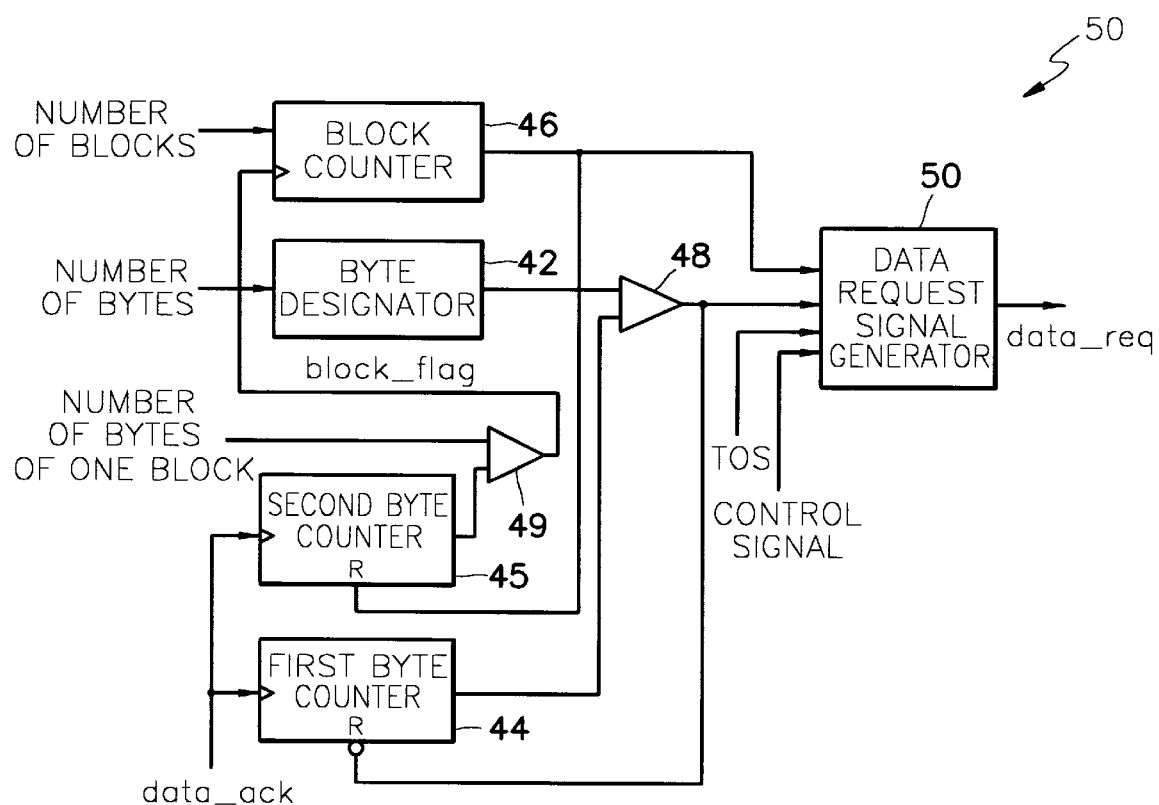
FIG. 5 is a flowchart illustrating the operation of the DVD-ROM interfacing apparatus shown in FIG. 3.

FIG. 4 is a timing diagram of signals received and transmitted by a DVD-ROM interfacing apparatus of FIG. 3, and FIG. 5 is a flowchart illustrating the operation of the DVD-ROM interfacing apparatus shown in FIG. 3. Referring to FIGS. 4 and 5, the operation of the DVD-ROM interfacing apparatus 30 will be described in detail.

When one block of data is to be transmitted from the DVD signal processor 10 to the host computer 18, the microcontroller 12 outputs a number N−1 representing an amount of data which would be transmitted at once or together. That number is then sent to the byte designator 32, so that the byte designator 32 stores the number. At the same time, the byte counter 34 is reset to zero. Since 2048 bytes or 2064 bytes generally comprise one block of data in the DVD, it is preferable that N is a divisor of 2048 or 2064 so that the number of bytes X times matches the number of bytes if 1 block, i.e., N×X=2048 or N×X=2064.

After a TOS signal is input to the ATAPI device (S102), the data request signal generator 38 checks the status of the memory 14, and activates the data request signal data_req by changing the level of the signal into a low level if there is a space for recording data in the memory 14 (S 104). The activated data request signal data_req is transmitted to the DVD signal processor 10.

Upon detecting the falling edge of the data request signal data_req, the DVD signal processor 10 outputs one byte of data DATA0 together with a data transmission acknowledgment signal data_ack to the DVD interface device 30 (S106).

The transmitted data DATA0 is stored in the memory 14 in synchronicity with the falling edge of the data transmission acknowledgment signal data_ack. Also, the byte counter 34 increments its stored value by one in response to the data transmission acknowledgment signal data_ack (S108).

Since the data request signal data_req is active after the data transmission acknowledgment signal data_ack is received, a second data DATA1 is transmitted along with the data transmission acknowledgment signal data_ack from the DVD signal processor 10 to the DVD interface device 30. Afterwards, the above steps are repeatedly carried out until a N-byte data is completely transmitted unless a control signal which requests a pause of the data transmission is input from the microcontroller 12 due to the deficiency of a storage space of the memory 14. If the control signal which requests a pause of the data transmission is input from the microcontroller 12, the transmission operation is paused, and the transmission is resumed when a control signal requesting data is input.

When N-byte data is completely transmitted (S110), the output of the byte counter 34 will be the same as the value stored in the byte designator 32. Accordingly, the comparator 36 outputs a low level signal. At this time, the level of the data request signal data_req output by the data request signal generator 38 changes into a high level to be deactivated (S112), and the byte counter 34 is reset to zero (S114).

Thus, one transmission cycle is completed. Subsequently, the transmission cycle is continued until one block of data is completely transmitted in a N-byte unit unless new data unit is input by the microcontroller 12. In case that a new data unit is designated by the microcontroller 12, the data transmission is carried out in the new data unit.

Figure 6:
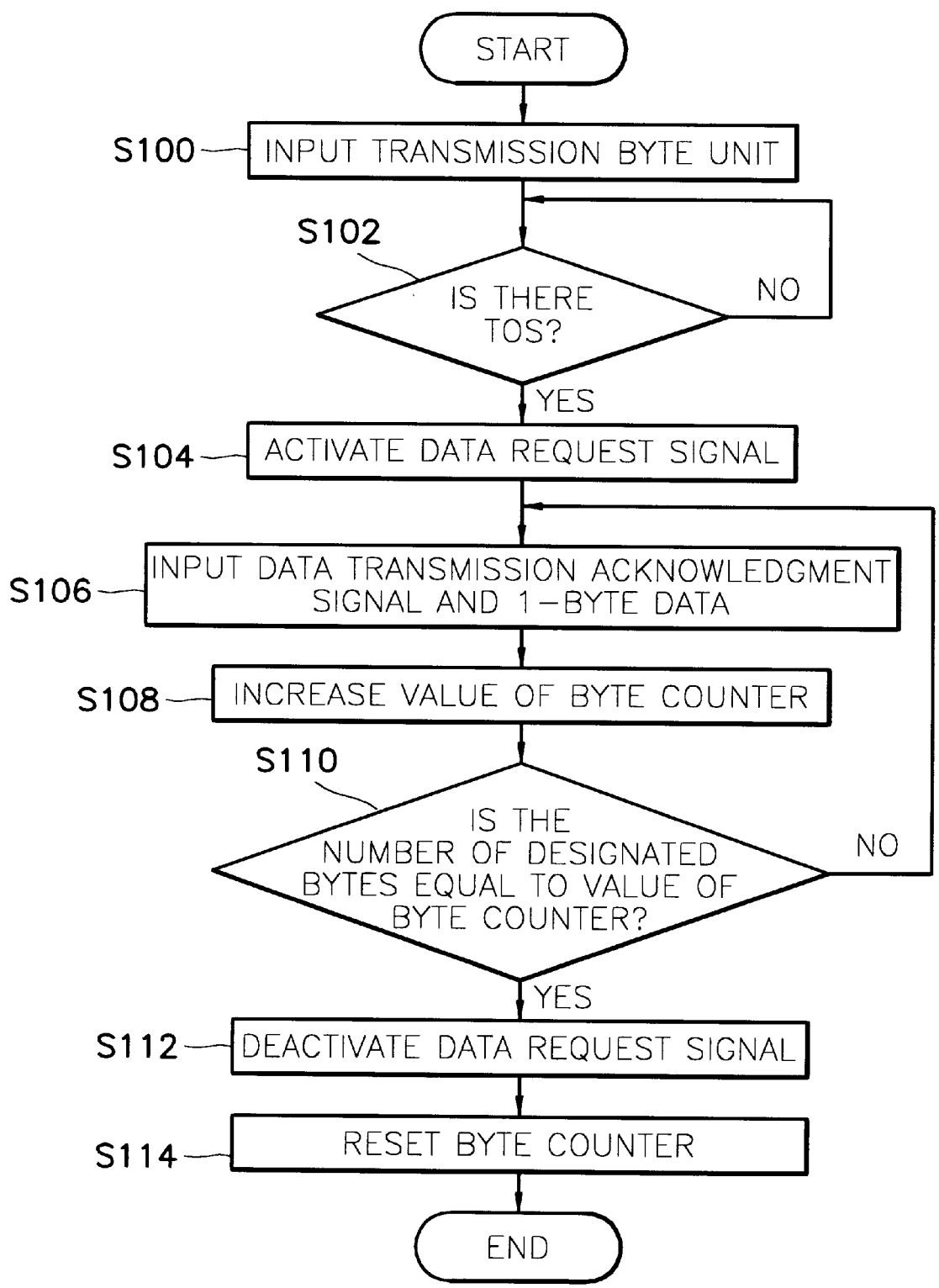
FIG. 6 is a block diagram of another embodiment of a DVD-ROM interfacing apparatus according to the present invention.

FIG. 6 is a block diagram of another embodiment of a DVD-ROM interfacing apparatus according to the present invention. The addition of duplicative components is an example of how to increase one capacity of an ATAPI device embodying the present invention. Since the microcontroller is typically the more expensive component in such an apparatus, adding certain other less expensive devices increase the capability of the apparatus by significant amounts without adding substantial costs. Some components of the apparatus shown in FIG. 6 are similar to the components of the apparatus shown in FIG. 3. Accordingly, the description of such components will be given in brief.

The DVD-ROM interfacing apparatus 40 shown in FIG. 6 includes a byte designator 42, a first byte counter 44, a second byte counter 45, a block counter 46, a first comparator 48, a second comparator 49 and a data request signal generator 50.

The byte designator 42 receives the number of bytes of transmission data designated by the microcontroller 12 and stores such number.

The first byte counter 44 up-counts a data transmission acknowledgment signal data_ack output by the DVD signal processor 10 is received. Afterwards, the first byte counter 44 is reset to zero after counting to the same number as that stored in the byte designator 42. The second byte counter 45 up-counts whenever the output signal of the second comparator 49 is received, to 2048 or 2064 which corresponds to the number of bytes included in one block.

The block counter 46 inputs and stores the number of blocks of transmission data designated by the microcontroller 12, and then down-counts whenever one block of data is transmitted, i.e., the output of the second comparator 49 is input. In the present embodiment, the maximum number of the designated blocks is 63.

The first comparator 48 compares the number of bytes stored in the byte designator 42 and the number of counted bytes output by the first byte counter 44.

The second comparator 49 compares the output of the second byte counter 45 with the size of one block, i.e., 2048 or 2046 bytes designated by the microcontroller 12. In the case that the two values are the same as each other, the second comparator 49 generates a flag block_flag to output the flag to the block counter 46, and resets the second byte counter 45 to zero.

The data request signal generator 50 generates a data request signal data_req according to a comparison result of the first comparator 48 or an output value of the block counter 46, and outputs the data request signal data_req to the DVD signal processor 10.

Figure 7:
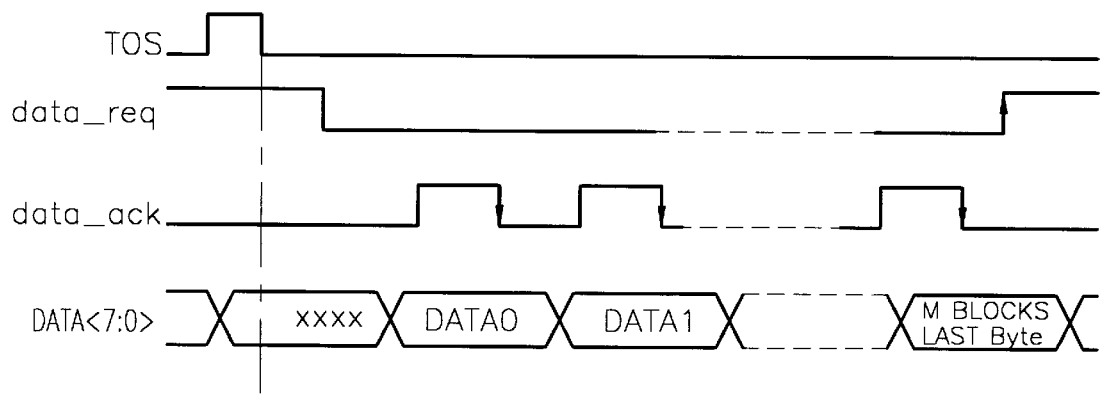
FIG. 7 is a timing diagram of signals received and transmitted by a DVD-ROM interfacing apparatus of FIG. 6.
Figure 1:
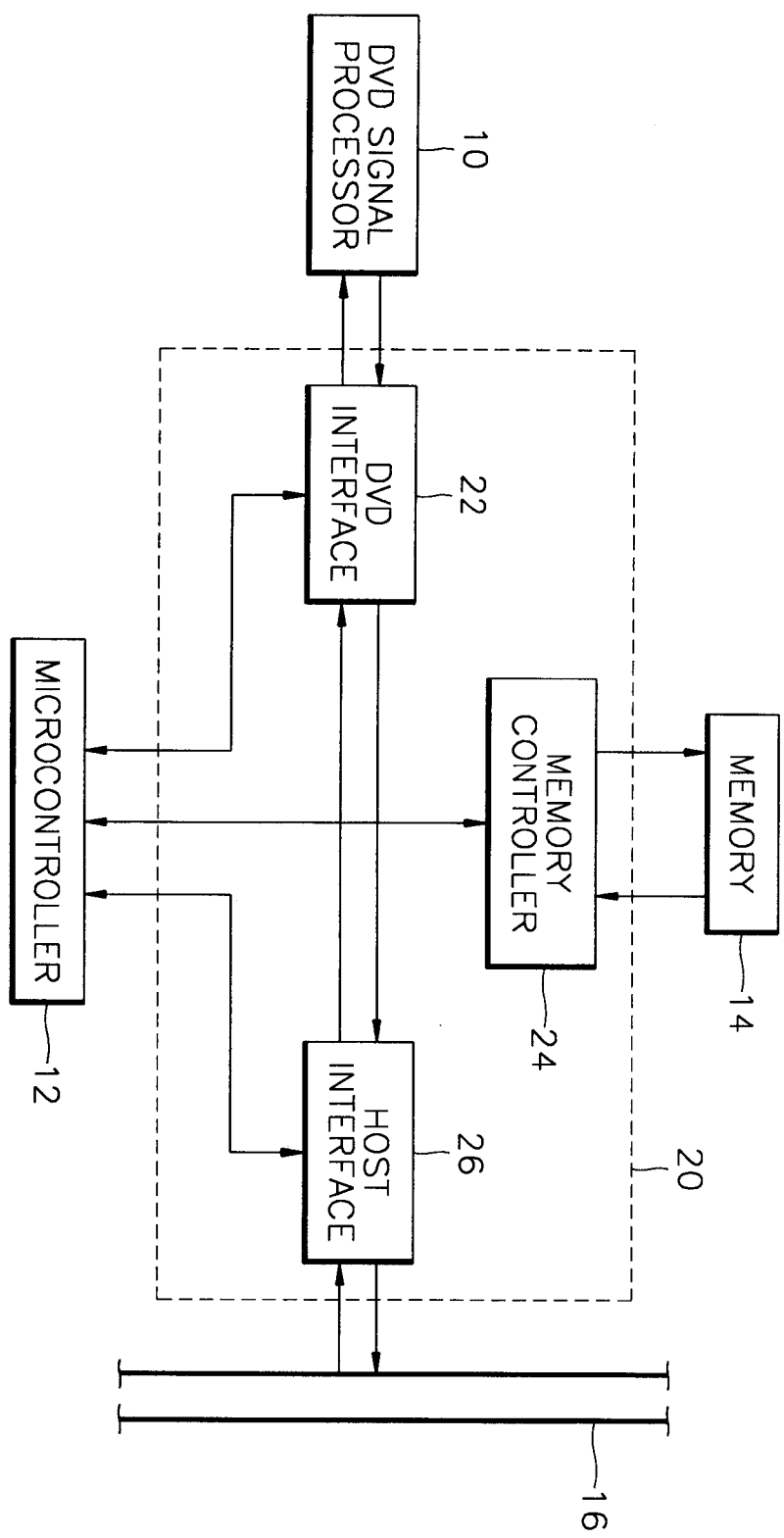
FIG. 1 is a block diagram of a typical ATAPI interface device.
Figure 1A:
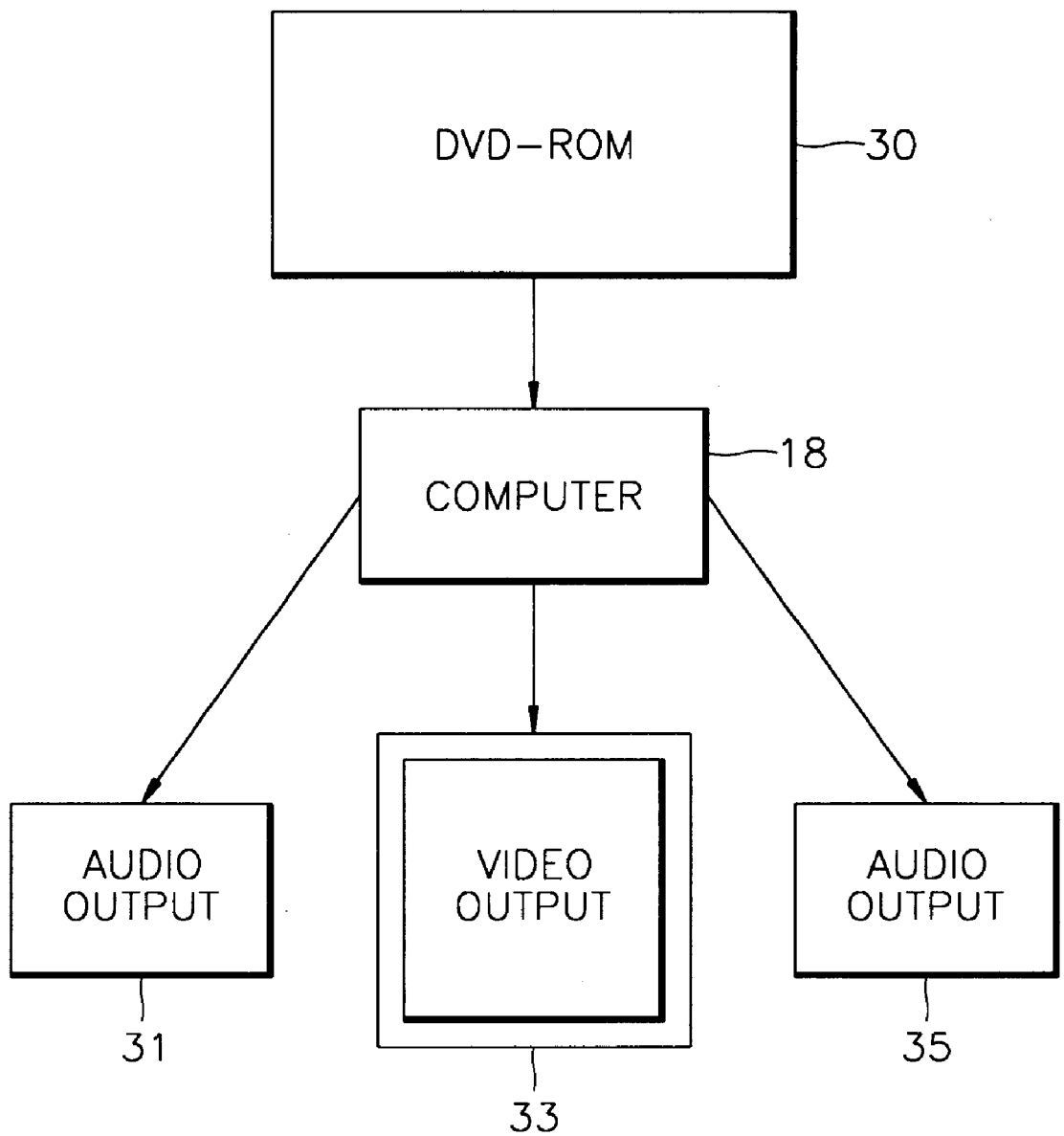
Figure 2:
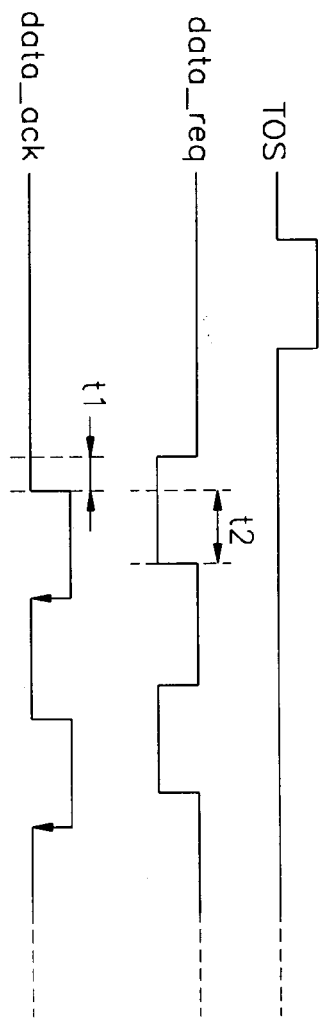
Figure 3:
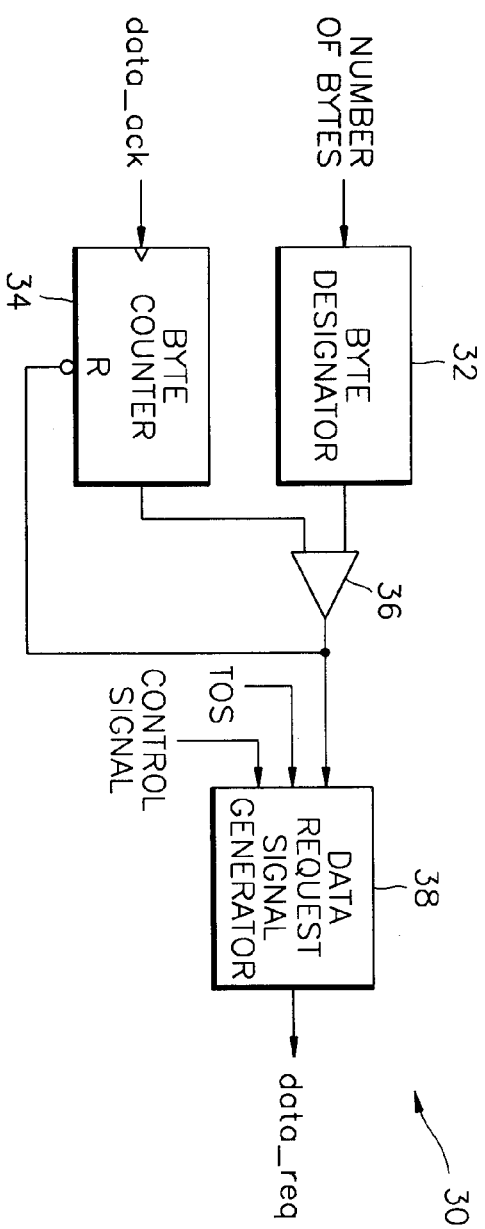
Figure 4:
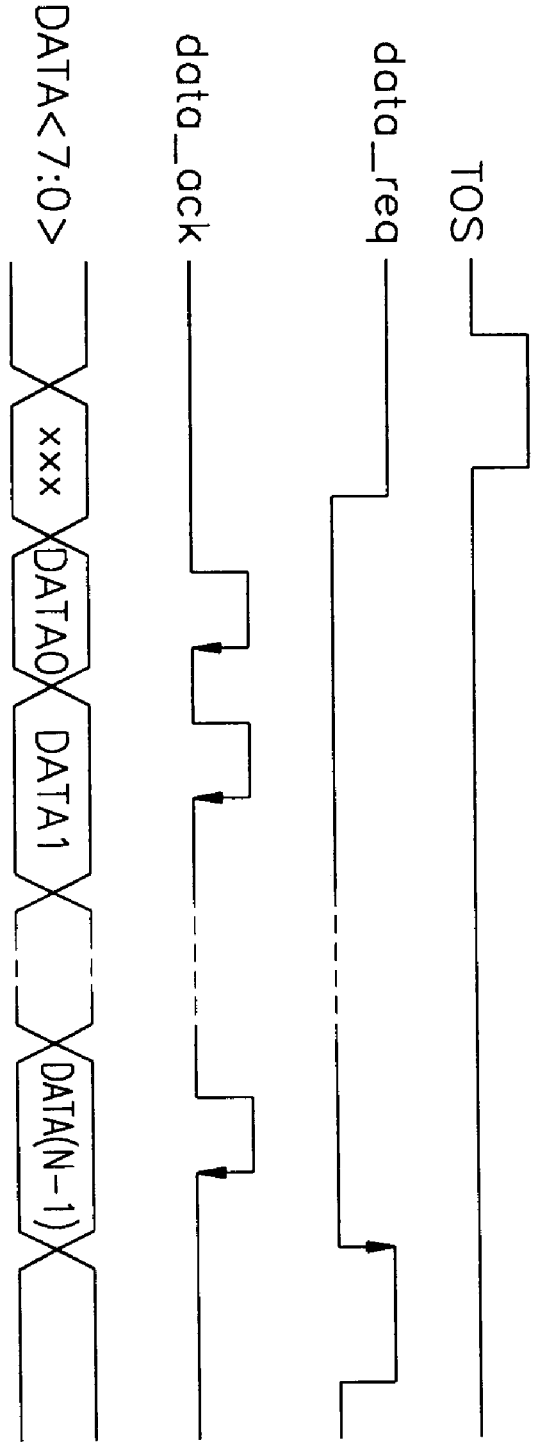
Figure 5:
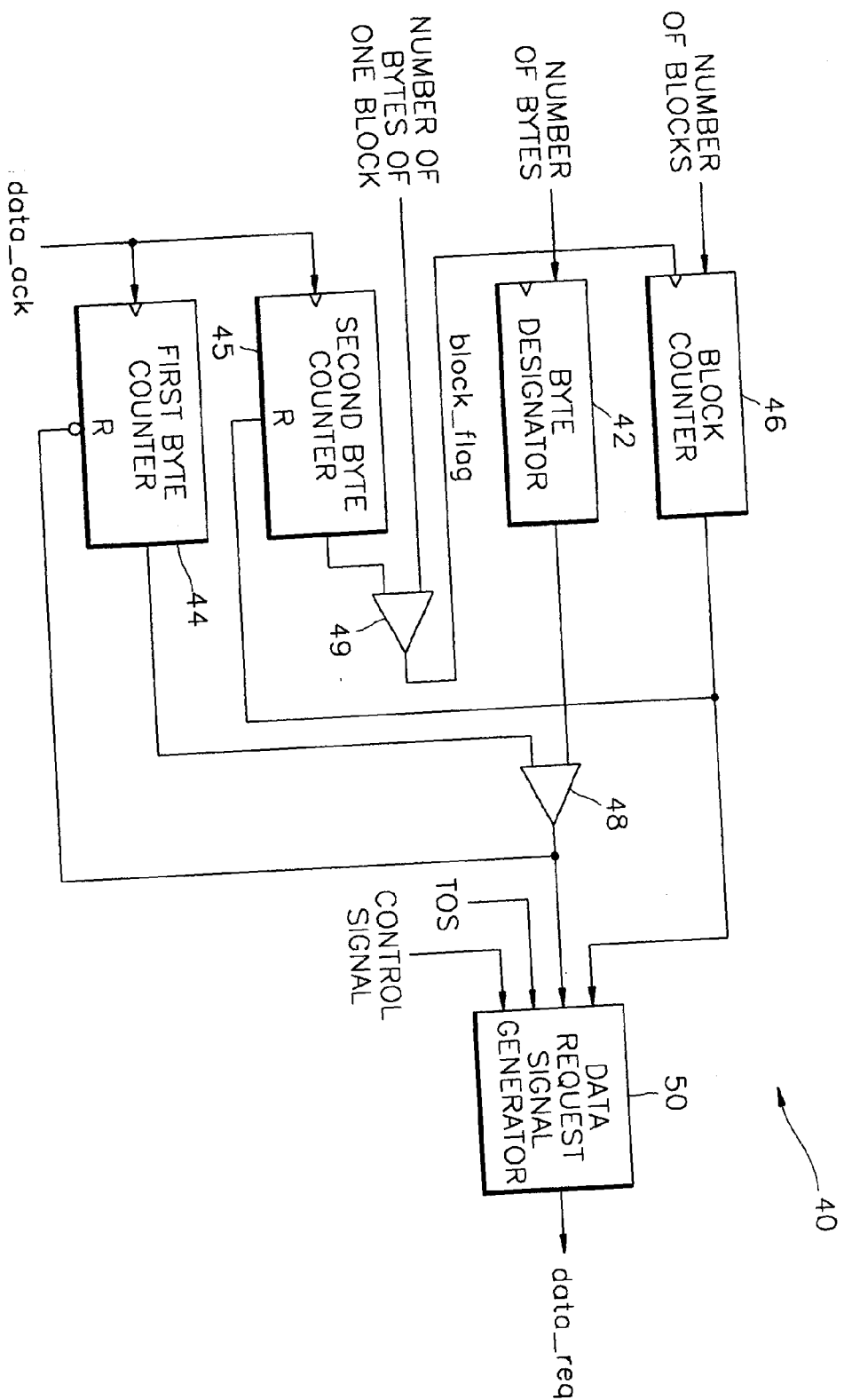
Figure 6:
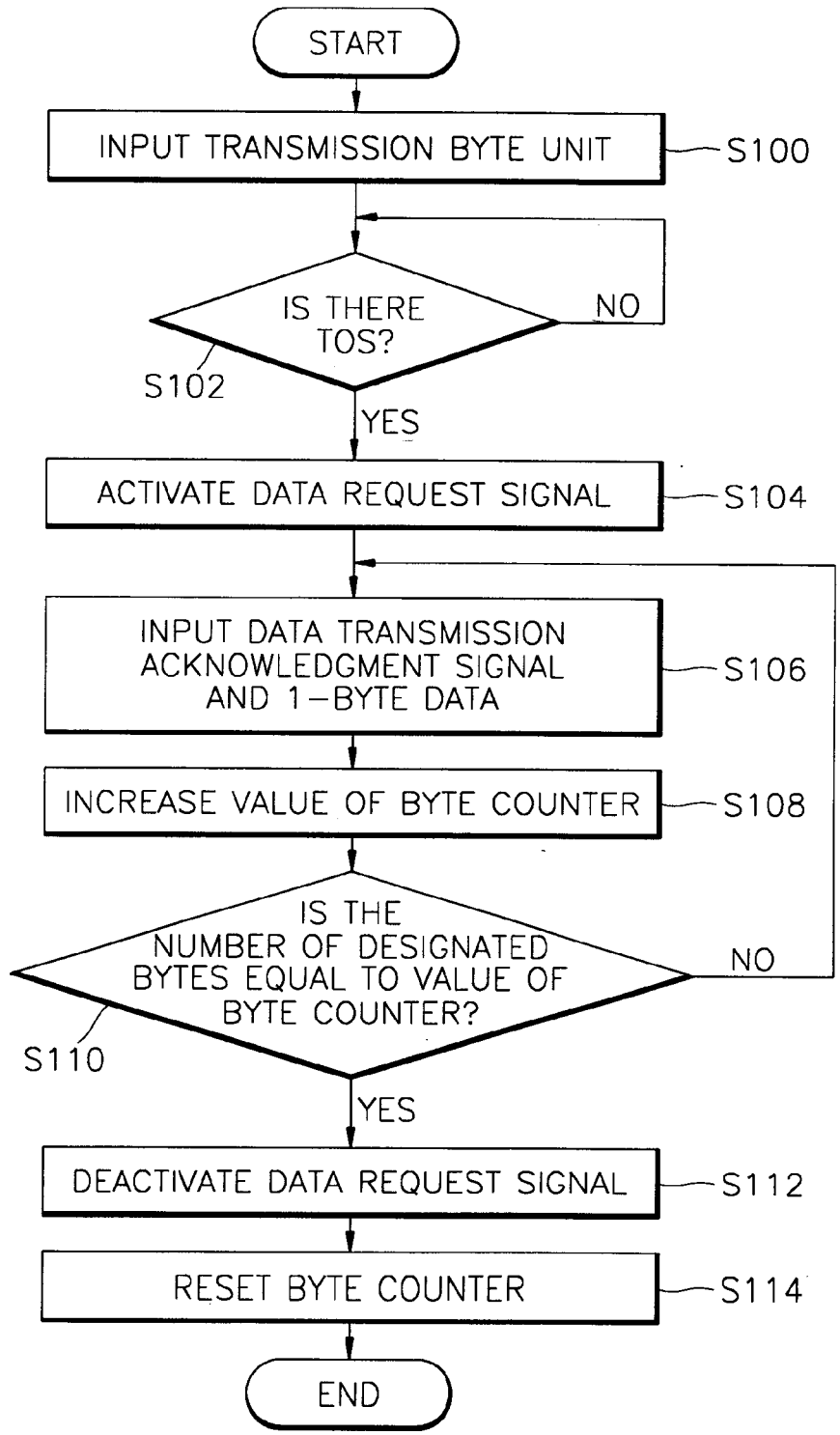
Figure 7:
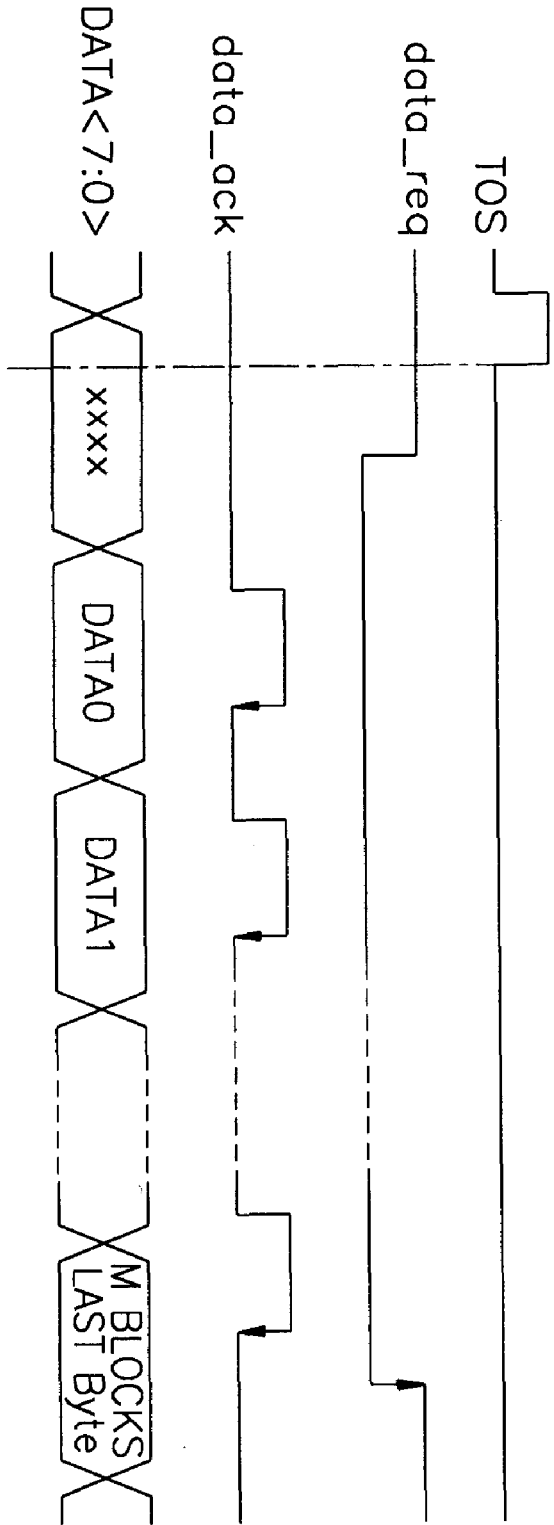
Figure 8:
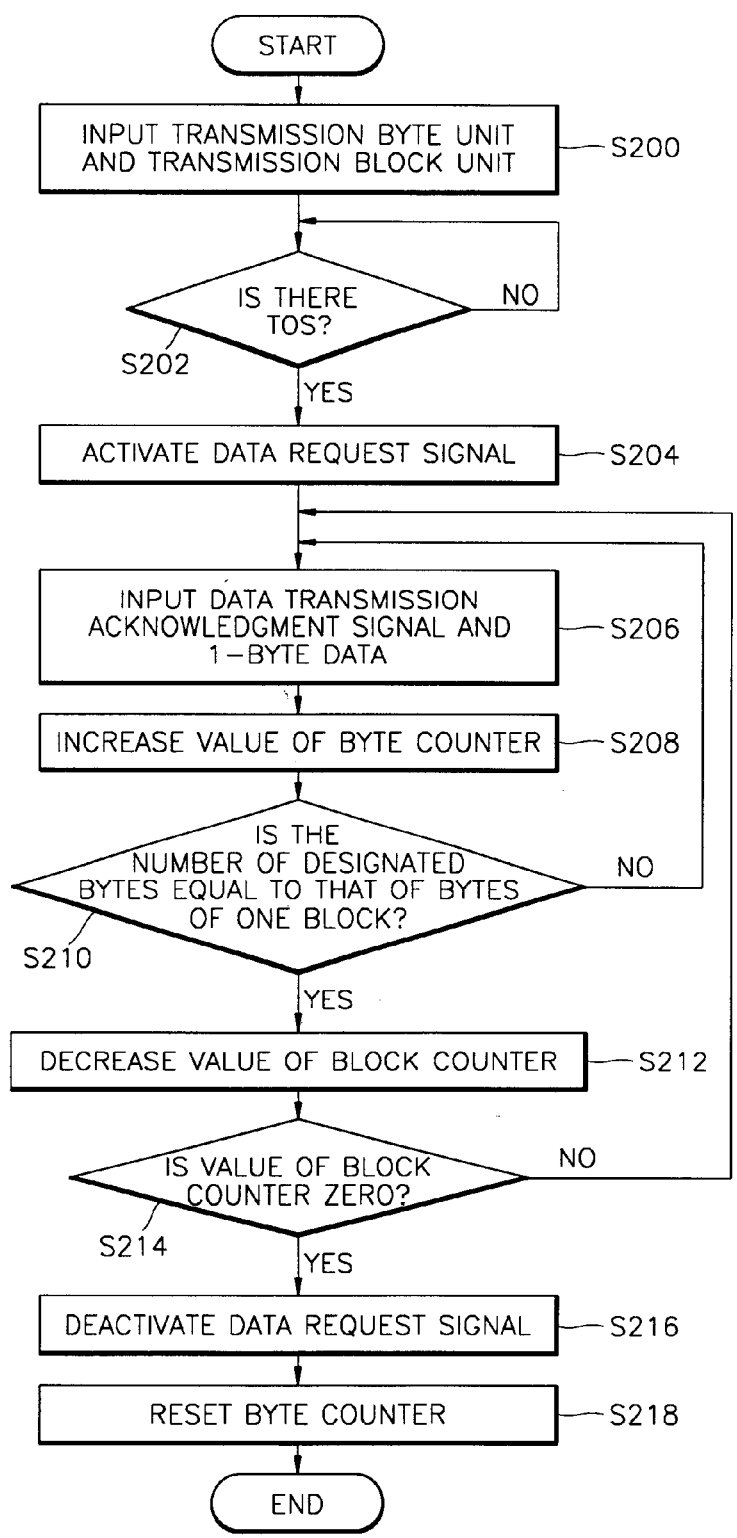
FIG. 8 is a flowchart illustrating the operation of the DVD-ROM interfacing apparatus shown in FIG. 6.

FIG. 7 is a timing diagram of signals received and transmitted by a DVD-ROM interfacing apparatus of FIG. 6, and FIG. 8 is a flowchart illustrating the operation of the DVD-ROM interfacing apparatus shown in FIG. 6.

Referring to FIGS. 7 and 8, the operation of the DVD-ROM interfacing apparatus 40 will be described in detail.

In the embodiment shown in FIG. 6, a plurality of bytes of data are transmitted for each data request signal, and a plurality of blocks up to 63 blocks may be transmitted for one TOS signal. Hereinafter, the operation of transmitting several of blocks of data will be described.

When M blocks of data are to be transmitted in N byte unit from the DVD signal processor to the host computer, the microcontroller 12 outputs a number N−1 to the byte designator 42 and the number M to the block counter 46 (step S200).

After a TOS signal is input to the ATAPI device (S202), the data request signal generator 50 checks the status of the memory 14, and activates the data request signal data_req by changing the level of the signal into a low level if there is a space for recording data in the memory 14 (S204). The activated data request signal data_req is transmitted to the DVD signal processor 10.

Upon detecting the falling edge of the data request signal data_req, the DVD signal processor 10 outputs one byte of data DATA0 together with a data transmission acknowledgment signal data_ack to the DVD interface device 30 (S206).

The transmitted data DATA0 is stored in the memory 14 in synchronicity with the falling edge of the data transmission acknowledgment signal data_ack. Also, the first and second byte counter 44 and 45 increments its stored value by one in response to the data transmission acknowledgment signal data_ack (S208). Since the data request signal data_req is still active after the data transmission acknowledgment signal data_ack is received, a second data DATA1 is transmitted along with the data transmission acknowledgment signal data_ack from the DVD signal processor 10 to the DVD interface device 40.

Whenever the transmission of N-byte data is completed, the first comparator 48 outputs a zero, and the first byte counter 44 is reset.

If all of one block data is transmitted in the above manner and the output of the second byte counter 45 is equal to the number of bytes of one block, i.e., 2048 or 2046 (S210), the second comparator 49 outputs a flag indicating the transmission of one bock data to the block counter 46. Subsequently, the value stored in the block counter 46 is decremented by one in response to the flag (S212).

When M blocks are completely transmitted by repeating the steps, the value of the block counter 46 becomes zero (S214). When both the output of the block counter 46 and the output of the first comparator 48 are zeroes, a data request signal data_req output by the data request signal generator 50 changes into a high level to be deactivated (S216), and the byte counter 44 is reset to zero (S218).

Meanwhile, in the case that the number of blocks designated by the microcontroller 12 and input to the block counter 46 is zero, the DVD-ROM interfacing apparatus of the present invention operates in the same way as that shown in FIG. 3.

A program code for generating a circuit of the above embodiment is attached. The code which is written in the Verilog hardware description language (HDL) produced by Cadence Design System Incorporation realizes a system in which the DVD-ROM interfacing apparatus according to the present invention is incorporated with a CD-ROM interfacing apparatus.

The present invention is not limited to the illustrated embodiment and many changes and modifications can be made. For example, in the case that new input byte unit N is input during the transmission of data, the transmission can be carried out in the new input byte unit. Also, a basic transmission unit of data may be a plurality of bytes instead of one byte.

As described above, according to a DVD-ROM interfacing apparatus and method of the present invention, a plurality of bytes of data is transmitted from the DVD signal processor to the ATAPI device in response to a transmission request, which can enhance transmission efficiency and operate with a high-speed host computer. Also, the burden of the microcontroller which controls the data transmission is reduced, which increases time for the microcontroller to perform the other functions.

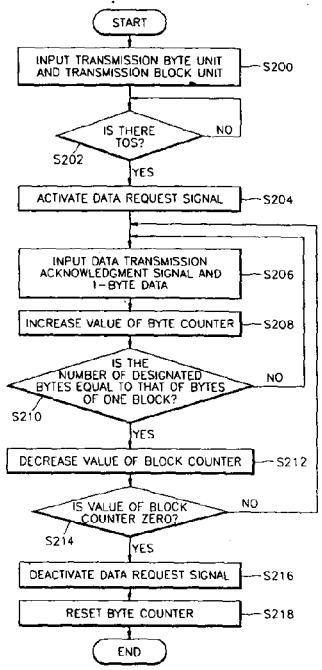

What is claimed is:

1. In an ATAPI device for interfacing a digital video disk signal processor with a data processor, a digital video disk ROM interfacing apparatus for controlling data transmission from said digital video disk signal processor to an ATAPI interfacing apparatus, comprising:

a byte designator for storing a number of designated units which is the number of data units which are to be transmitted together;

a counter for up-counting when a data unit is transmitted to output a number of transmitted data units;

a comparator for comparing the number of designated units stored in said byte designator with the number of transmission units output by said counter; and a data request signal generator for requesting data transmission from said digital video disk signal processor according to a comparison result of said comparator, wherein the data request signal generator activates a data request signal to begin an N-byte data transmission and maintains the data request signal in an active state until the N-byte data transmission is complete.

2. The digital video disk ROM interfacing apparatus of claim 1, wherein the data unit is 1 byte.

3. The digital video disk ROM interfacing apparatus of claim 1, wherein said byte designator receives the number of designated units from a microcontroller of a digital video disk ROM drive system.

4. The digital video disk ROM interfacing apparatus of claim 1, wherein said data request signal generator requests data transmission from said digital video disk signal processor until the number of designated units is equal to the number of the transmission unit according to the comparison result of said comparator.

5. In an ATAPI device for interfacing a digital video disk signal processor with a data processor, a digital video disk ROM interfacing apparatus for controlling data transmission from said digital video disk signal processor to an ATAPI interfacing apparatus, comprising:

byte designator for storing a number of designated units which is the number of data units which are to be transmitted once;

a first counter for up-counting when a data unit is transmitted and to output a number of transmitted data units;

a first comparator for comparing the number of designated units stored in said byte designator and the number of transmission units output by said first counter;

a block counter for storing the number of data blocks to be transmitted and decrementing the stored value by one whenever one block is transmitted; and a data request signal generator for requesting data transmission from said digital video disk signal processor according to a comparison result of said comparing means and a counted value of said block counter, wherein the data request signal generator activates a data request signal to begin an M-block data transmission and maintains the data request signal in an active state until the M-block data transmission is complete.

6. The digital video disk ROM interfacing apparatus of claim 5, wherein the data unit is 1-byte.

7. The digital video disk ROM interfacing apparatus of claim 5, further comprising:

a second counter for up-counting whenever one data unit is transmitted to output the number of transmitted units; and a second comparator for comparing the number of data units forming one block and the counted value output by said second counter, generating a flag signal when the two values are the same each other to output the flag signal to the block counter, and generating a reset signal for resetting said second counter.

8. The digital video disk ROM interfacing apparatus of claim 7, wherein said second comparator receives the number of data units forming one block from a microcontroller of a digital video disk ROM drive system.

9. The digital video disk ROM interfacing apparatus of claim 5, wherein said byte designation means receives the number of designated units from a microcontroller of a digital video disk ROM drive system, and said block counter receives the number of designated blocks from the microcontroller.

10. The digital video disk ROM interfacing apparatus of claim 5, wherein said data request signal generator requests data transmission from said digital video disk signal processor until the number of the designated units is equal to the number of the transmission units according to the comparison result of said first comparator and a counted value of said block counter is zero.

11. An ATAPI device for interfacing a digital video disk signal processor and a data processor, comprising:

a digital video disk ROM interface for receiving reproduced data from a digital video disk signal processor under the control of an external microcontroller;

a memory controller for controlling an external memory to store and read data received through said digital video disk ROM interfacing unit; and a host interface for receiving operational commands and other control signals from said data processor through an ATAPI bus to transmit the received commands and control signals to said digital video disk ROM interface and transmitting the reproduced data to said data processor through said ATAPI bus, wherein said digital video disk ROM interface comprises a byte designator for storing a number of designated units which is the number of data units which are to be transmitted once;

a counter for up-counting when a data unit is transmitted to output a number of transmitted units;

a comparator for comparing the number of designated units stored in said byte designator with the number of transmission units output by said counter; and a data request signal generator for requesting data transmission from said digital video disk signal processor according to a comparison result of said comparator, wherein the data request signal generator activates a data request signal to begin an M-block data transmission and maintains the data request signal in an active state until the M-block data transmission is complete.

12. An ATAPI device for interfacing a digital video disk signal processor and a data processor, comprising:

a digital video disk ROM interface for receiving reproduced data from a digital video disk signal processor under the control of an external microcontroller;

a memory controller for controlling an external memory to store and read data received through said digital video disk ROM interfacing unit; and a host interface for receiving operational commands and other control signals from said data processor through an ATAPI bus to transmit the received commands and control signals to said digital video disk ROM interface and transmitting the reproduced data to said data processor through said ATAPI bus, wherein said digital video disk ROM interface comprises a byte designator for storing a number of designated units which is the number of data units which are to be transmitted once;

a first counter for up-counting when a data unit is transmitted and to output a number of transmitted data units;

a first comparator for comparing the number of designated units stored in said byte designator and the number of transmission units output by said first counter;

a block counter for storing the number of data blocks to be transmitted and decrementing the stored value by one whenever one block is transmitted; and a data request signal generator for requesting data transmission from said digital video disk signal processor according to a comparison result of said comparing means and an counted value of said block counter, wherein the data request signal generator activates a data request signal to begin an M-block data transmission and maintains the data request signal in an active state until the M-block data transmission is complete.

13. In an ATAPI device for interfacing a digital video disk signal processor with a data processor, a digital video disk ROM interfacing method for controlling data transmission from the digital video disk signal processor to the ATAPI interfacing apparatus, comprising the steps of:

storing a number of designated units which is the number of data units which are to be transmitted once;

activating a data request signal;

receiving a data transmission acknowledgment signal and one unit of data from the digital video disk signal processor;

up-counting whenever one unit of data is transmitted to count the number of transmission units;

comparing the number of the designated units with the number of the transmission units;

maintaining the data request signal in the active state until the number of designated units is transmitted; and inactivating the data request signal according to the comparison result.

14. The digital video disk ROM interfacing method of claim 13, wherein said unit is one byte.

15. In an ATAPI device for interfacing a digital video disk signal processor with a data processor, a digital video disk ROM interfacing method for controlling data transmission from the digital video disk signal processor to the ATAPI interfacing apparatus, comprising the steps of:

storing a number of designated units which is the number of data units which are to be transmitted once and a number of data blocks which are to be transmitted;

activating a data request signal;

receiving a data transmission acknowledgment signal and one unit of data from the digital video disk signal processor;

up-counting when a unit of data is transmitted to count the number of transmission units;

comparing the number of the designated units with the number of the transmission data units;

comparing a number of transmitted blocks with the number of data blocks to be transmitted;

maintaining the data request signal in the active state until the number of designated units is transmitted; and inactivating the data request signal according to a comparison result of the number of the designated units with the number of the transmitted data units and a comparison result of the number of blocks to be transmitted with the number of transmitted data blocks.

16. The digital video disk ROM interfacing method of claim 15, wherein said unit is one byte.

17. A digital video disk ROM system comprising:
a pickup;
a plurality of servos for mechanically controlling said digital video disk ROM system;
a DVD signal processor for demodulating and decoding signals read by said pickup to recover an original data;
an advanced technology attachment packet interface (ATAPI) device for interfacing said DVD signal processor with an external data processor; and
a microcontroller for controlling the operation of said DVD signal processor and said ATAPI device,
wherein said ATAPI device comprises:
 a digital video disk ROM interface for receiving reproduced data from said digital video disk signal processor under the control of said microcontroller;
 a memory controller for controlling an external memory to store and read data received through said digital video disk ROM interfacing unit; and
 a host interface for receiving operational commands and other control signals from said data processor through an ATAPI bus to transmit the received commands and control signals to said digital video disk ROM interface and transmitting the reproduced data to said data processor through said ATAPI bus,
wherein said digital video disk ROM interface comprises:
 byte designation means for storing a number of designated units which is the number of data units which are to be transmitted once;
 a first counter for up-counting whenever one data unit is transmitted and outputting the number of transmitted units;
 a first comparator for comparing the number of designated units stored in said byte designation means and the number of transmission units output by said first counter;
 a block counter for storing the number of data blocks to be transmitted and decrementing the stored value by one whenever one block is transmitted; and
 a data request signal generator for requesting data transmission from said digital video disk signal processor according to a comparison result of said comparing means and a counted value of said block counter, wherein the data request signal generator activates a data request signal to begin a data transmission and maintains the data request signal in an active state until the data transmission is complete.

* * * * *

UNITED STATES PATENT AND TRADEMARK OFFICE
CERTIFICATE OF CORRECTION

PATENT NO.    : 6,119,177
DATED         : September 12, 2000
INVENTOR(S)   : Kim It is certified that error appears in the above-identified patent and that said Letters Patent is hereby corrected as shown below:

Replace title page with attached title page

Replace FIG. 1, 1A, 2, 3, 4, 5, 6, 7 and 8 with the attached drawings.

Column 4,
Line 53, "data req" should read -- data_req --.

Column 6,
Line 29, "2046 bytes" should read -- 2064 bytes --.

Column 7,
Line 17, "2046 bytes" should read -- 2064 bytes --.
Line 19, "bock" should read -- block --.

Column 8,
Line 58, "the same each other" should read -- the same as each other --.

Signed and Sealed this

Nineteenth Day of August, 2003

JAMES E. ROGAN
*Director of the United States Patent and Trademark Office*

United States Patent [19]

Kim

[11] Patent Number: 6,119,177
[45] Date of Patent: Sep. 12, 2000

[54] DIGITAL VIDEO DISK ROM INTERFACING APPARATUS AND METHOD THEREOF

[75] Inventor: Jeh-won Kim, Goyang, Rep. of Korea

[73] Assignee: Samsung Electronics, Co., Ltd., Suwon, Rep. of Korea

[21] Appl. No.: 09/000,983

[22] Filed: Dec. 30, 1997

[30] Foreign Application Priority Data

Dec. 30, 1996 [KR] Rep. of Korea .................. 96-76994

[51] Int. Cl.$^7$ ................................................ G06F 13/00
[52] U.S. Cl. .................................................. 710/34; 710/29
[58] Field of Search ................................. 710/29, 33–35, 710/52, 53, 57

[56] References Cited

U.S. PATENT DOCUMENTS

| | | | |
|---|---|---|---|
| 4,831,523 | 5/1989 | Lewis et al. | 364/200 |
| 4,837,563 | 6/1989 | Mansfield et al. | 340/732 |
| 5,261,072 | 11/1993 | Siegel | 395/425 |
| 5,450,546 | 9/1995 | Krakirian | 395/250 |
| 5,452,432 | 9/1995 | Macachor | 395/425 |
| 5,469,548 | 11/1995 | Callison et al. | 395/441 |
| 5,640,602 | 6/1997 | Takase | 395/855 |
| 5,647,057 | 7/1997 | Roden et al. | 395/275 |

*Primary Examiner*—Ayaz R. Sheikh
*Assistant Examiner*—Jigar Pancholi
*Attorney, Agent, or Firm*—Marger Johnson & McCollom, P.C.

[57] ABSTRACT

In an ATAPI device and method for interfacing a digital video disk signal processor with a data processor, a digital video disk ROM interfacing apparatus controls data transmission from the digital video disk signal processor to the ATAPI interfacing apparatus such that a plurality of bytes of data are transmitted for each data transmission request. In the digital video disk ROM interfacing apparatus, a byte designator stores a number of designated units which is the number of data units which are to be transmitted once. A counter up-counts when a data unit is transmitted and outputs a number of transmitted units. A comparator compares the number of designated units output by the byte designation means with the number of transmission units output by the counter. A data request signal generator requests data transmission to the digital video disk signal processor according to a comparison result from the comparator.

17 Claims, 7 Drawing Sheets